(12) United States Patent
Choi

(10) Patent No.: US 11,368,627 B2
(45) Date of Patent: Jun. 21, 2022

(54) IMAGE CAPTURING APPARATUS, ELECTRONIC DEVICE WITH CAMERA MODULE, AND CAMERA MODULE CONTROL METHOD

(71) Applicant: Samsung Electro-Mechanics Co., Ltd., Suwon-si (KR)

(72) Inventor: Chul Choi, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/067,197

(22) Filed: Oct. 9, 2020

(65) Prior Publication Data

US 2021/0203854 A1    Jul. 1, 2021

(30) Foreign Application Priority Data

Dec. 27, 2019    (KR) .................. 10-2019-0176827

(51) Int. Cl.
*H04N 5/232*    (2006.01)
*H04N 5/225*    (2006.01)

(52) U.S. Cl.
CPC ....... *H04N 5/23299* (2018.08); *H04N 5/2257* (2013.01); *H04N 5/22525* (2018.08); *H04N 5/23229* (2013.01); *H04N 5/23293* (2013.01)

(58) Field of Classification Search
CPC .. H04N 5/2253; H04N 5/2254; H04N 5/2257; H04N 5/22525; H04N 5/23229; H04N 5/23232; H04N 5/23293-232939; H04N 5/23299; G06F 1/1605; G03B 30/00
See application file for complete search history.

(56) References Cited

U.S. PATENT DOCUMENTS

| | | | |
|---|---|---|---|
| 10,331,260 B2 | 6/2019 | Evans, V et al. | |
| 2019/0373166 A1* | 12/2019 | Jia | H04N 5/2257 |
| 2020/0036908 A1* | 1/2020 | Rubinstein | G06T 5/20 |
| 2020/0195764 A1* | 6/2020 | Xu | H04N 5/2258 |

FOREIGN PATENT DOCUMENTS

| | | |
|---|---|---|
| JP | 2003-110983 A | 4/2003 |
| KR | 10-2010-0069896 A | 6/2010 |
| KR | 10-2016-0149945 A | 12/2016 |
| KR | 10-2017-0025807 A | 3/2017 |

OTHER PUBLICATIONS

Korean Office Action dated Nov. 9, 2020 in counterpart Korean Office Action No. 10-2019-0176827 (8 pages in English, 6 pages in Korean).

* cited by examiner

*Primary Examiner* — Paul M Berardesca
(74) *Attorney, Agent, or Firm* — NSIP Law

(57) ABSTRACT

An image capturing apparatus is provided. The image capturing apparatus includes a display member, configured to display an image, a camera module, disposed behind the display member, and a touch sensor member, configured to detect a touch input. The camera module is configured to capture a first image in a first position in front of the display member or the touch sensor member, and to capture a second image in a second position in front of the display member or in front of the touch sensor member, the second position being different from the first position. An image capturing position of the camera module is moved such that at least a portion of a non-captured region, covered with the display member or the touch sensor member in one of the first and second images, is not covered in the other of the first and second images.

28 Claims, 17 Drawing Sheets

300a

300b 310b  311b 312b

MOVE

IMAGE CAPTURING APPARATUS, ELECTRONIC DEVICE WITH CAMERA MODULE, AND CAMERA MODULE CONTROL METHOD

CROSS-REFERENCE TO RELATED APPLICATION(S)

This application claims the benefit under 35 USC 119(a) of Korean Patent Application No. 10-2019-0176827 filed on Dec. 27, 2019 in the Korean Intellectual Property Office, the entire disclosure of which is incorporated herein by reference for all purposes.

BACKGROUND

1. Field

This application relates to an image capturing apparatus, an electronic device with a camera module, and a camera module control method.

2. Description of Related Art

Electronic devices, such as smartphones, personal digital assistants (PDAs), digital video cameras, digital still cameras, network systems, personal computers (PCs), monitors, tablet PCs, laptop PCs, netbook PCs, televisions, video game machines, smartwatches, automotive components, and the like, have been miniaturized.

Therefore, it may be easy to reduce the sizes of components included in an electronic device. However, it may be difficult to reduce a display area and/or a touch detection area of the electronic device, as compared with the other components of the electronic device.

The electronic device may include a camera module, which captures an external image. The camera module may utilize an image capturing path to capture an image external to the electronic device. In view of the image capturing path of the camera module, it may be more difficult to reduce the display area and/or the touch detection area of the electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an image capturing apparatus includes a display member, configured to display an image; a camera module, disposed behind the display member; and a touch sensor member, configured to detect a touch input; wherein the camera module is configured to: capture a first image in a first position in front of the display member or in front of the touch sensor member, and capture a second image in a second position in front of the display member or in front of the touch sensor member, the second position being different from the first position, wherein an image capturing position of the camera module is moved such that at least a portion of a non-captured region, covered by the display member or the touch sensor member in one of the first image and the second image, is not covered in the other of the first image and the second image.

The camera module may be configured to capture the second image after the image capturing position is moved in a first direction, and may be configured to capture a third image after the image capturing position is moved in a second direction, and the image capturing position of the camera module may be moved such that at least a portion of a first non-captured region and a second non-captured region, that is covered with the display member or the touch sensor member in one of the first image, the second image, and the third image, is not covered in a remainder of the first image, the second image, and the third image.

The apparatus may further include a processor, configured to generate a composite image by composing regions other than the first non-captured region and the second non-captured region, in one of the first image, the second image, and the third image, and first and second composite regions corresponding to the first non-captured region and the second non-captured region in a remainder of the first image, the second image, and the third image.

The apparatus may further include a driver, configured to receive first and second camera control signals from the processor, and control the image capturing position of the camera module based on the first and second camera control signals, wherein the processor is configured to: store camera movement path information; generate the first camera control signal based on a determination that the camera module has captured the first image, and based on the camera movement path information, and generate the second camera control signal based on a determination that the camera module has captured the second image, and based on the camera movement path information.

The apparatus may further include a controller configured to: store camera movement path information; generate a first camera control signal based on a determination that the camera module has captured the first image, and based on the camera movement path information; and generate a second camera control signal based on a determination that the camera module has captured the second image, and based on the camera movement path information; and a driver, configured to control the image capturing position of the camera module based on the first camera control signal and the second camera control signal.

The apparatus may further include a driver, configured to: store camera movement path information; move the image capturing position of the camera module in a first direction based on a determination that the camera module has captured the first image, and based on the camera movement path information; move the image capturing position of the camera module in a second direction based on a determination that the camera module has captured the second image, and based on the camera movement path information.

The camera module may be further configured to capture a fourth image after the image capturing position is moved in a third direction, and one of the first direction, the second direction, and the third direction is diagonal to a remainder of the first direction, the second direction, and the third direction.

The display member or the touch sensor member may be configured to cover a front surface of the camera module.

The display member or the touch sensor member may include an electric wire, and the non-captured region is covered by the electric wire.

The camera module may be configured to capture a pre-image before capturing the first image, and the image capturing position of the camera module may be moved by an image capturing movement distance that is determined based on a thickness of a region corresponding to the electric wire in the pre-image.

The camera module may be configured to capture a pre-image before capturing the first image, and is configured to capture a plurality of images including the first image and the second image, the image capturing position of the camera module is sequentially moved by a number of times that is determined based on a number of a plurality of regions divided by a region corresponding to the electric wire, and a number of the plurality of images is determined based on the number of the plurality of divided regions.

In a general aspect, an electronic device includes a display member configured to display an image; a camera module disposed behind the display member and configured to capture a first image in a first position in front of the display member, and to capture a second image in a second position in front of the display member, wherein the first position is different from the second position; and a controller configured to control an image capturing position of the camera module such that at least a portion of a non-captured region, covered by the display member in one of the first image and the second image, is not covered in the other of the first image and the second image.

The display member may be configured to cover a front surface of the camera module.

The device may further include a processor configured to generate a composite image by composing regions other than the non-captured region, in one of the first image and the second image, and a composite region, corresponding to the non-captured regions, in the other of the first image and the second image.

The device may include a controller, configured to store camera movement path information, and to generate a camera control signal based on a determination that the camera module has captured the first image and the camera movement path information, wherein the driver is configured to control the image capturing position of the camera module based on the camera control signal.

The camera module may be configured to capture a pre-image before capturing the first image, and one of the processor, the controller, and the driver may be configured to determine an image capturing position movement distance based on a thickness of a region that is covered by the display member in the pre-image, and store the camera movement path information based on the image capturing position movement distance.

The camera module may be configured to capture a pre-image before capturing the first image, and capture a plurality of images including the first image and the second image, and one of the processor, the controller, and the driver may be configured to determine a number of camera movement times based on a number of a plurality of regions divided by a region covered by the display member in the pre-images, and store the camera movement path information based on the number of times of camera movement.

The driver may be configured to move the image capturing position of the camera module in a first direction, and move the image capturing position of the camera module in a second direction after the camera module captures the first image, and the camera module may be configured to capture a third image after the driver moves the image capturing position in the second direction.

The driver may be configured to move the image capturing position of the camera module in a third direction after the camera module captures the third image, the camera module is configured to capture a fourth image after the driver moves the image capturing position in the third direction, and one of the first direction, the second direction, and the third direction is diagonal to a remainder of the first direction, the second direction, and the third direction.

In a general aspect, a camera module control method includes requesting, by an electronic device, camera movement path information which includes a path through which an image capturing position of the camera module is moved; capturing a first image of the camera module; controlling a movement of the image capturing position of the camera module in a first direction based on the camera movement path information until the camera module captures a second image after the camera module captures the first image; capturing a third image of the camera module; controlling movement of the image capturing position of the camera module in a second direction based on the camera movement path information until the camera module captures the third image after the camera module captures the second image; and generating a composite image by composing regions other than a first non-captured region and a second non-captured region, in one of the first image, the second image, and the third image, and a composite region corresponding to the first non-captured region and the second non-captured regions, in a remainder of the first image, the second image, and the third image.

In a general aspect, an electronic device includes a display element; a camera module including an image capturing device; wherein the image capturing device is configured to: capture a first image disposed in a first image capturing position path of the camera module; and capture a second image disposed in a second image-capturing position path of the camera module; a processor, configured to compare the first image and the second image, and determine whether a portion of the first image and the second image is covered by a portion of the display element; and a controller, configured to capture a third image based on a result of the comparing.

The device may include a driver configured to move a lens of the camera module to control the movement between the first image-capturing position and the second image-capturing position.

The processor may be configured to generate a composite image from the first image, the second image and the third image, and output the composite image.

The composite image may be generated by composing regions of the first image excluding regions covered by the portion of the display element, with regions of the one or more second images that overlap the excluded regions of the first image.

In a general aspect, an electronic device includes a processor; a driver; and a camera module configured to: capture, in a first image-capturing position, a first image including an obscured region disposed in an image capturing path of the camera module; and capture, in a second camera module position, a second image excluding the obscured region; wherein the first image-capturing position is different from the second image-capturing position, and wherein the processor is configured to generate a composite image by composing regions of the first image other than the obscured region, with a composite region of the second image overlapping the obscured region.

The processor may be configured to determine thickness information of the obscured region, and generate image capturing position movement information of the camera module based on the thickness information.

The driver may be configured to move a lens of the camera module in one of an x-axis direction and a y-axis direction to control the image capturing position of the camera module.

The processor may be configured to generate camera movement path information based on a pre-image that is captured by the camera module before the capturing of the first image.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
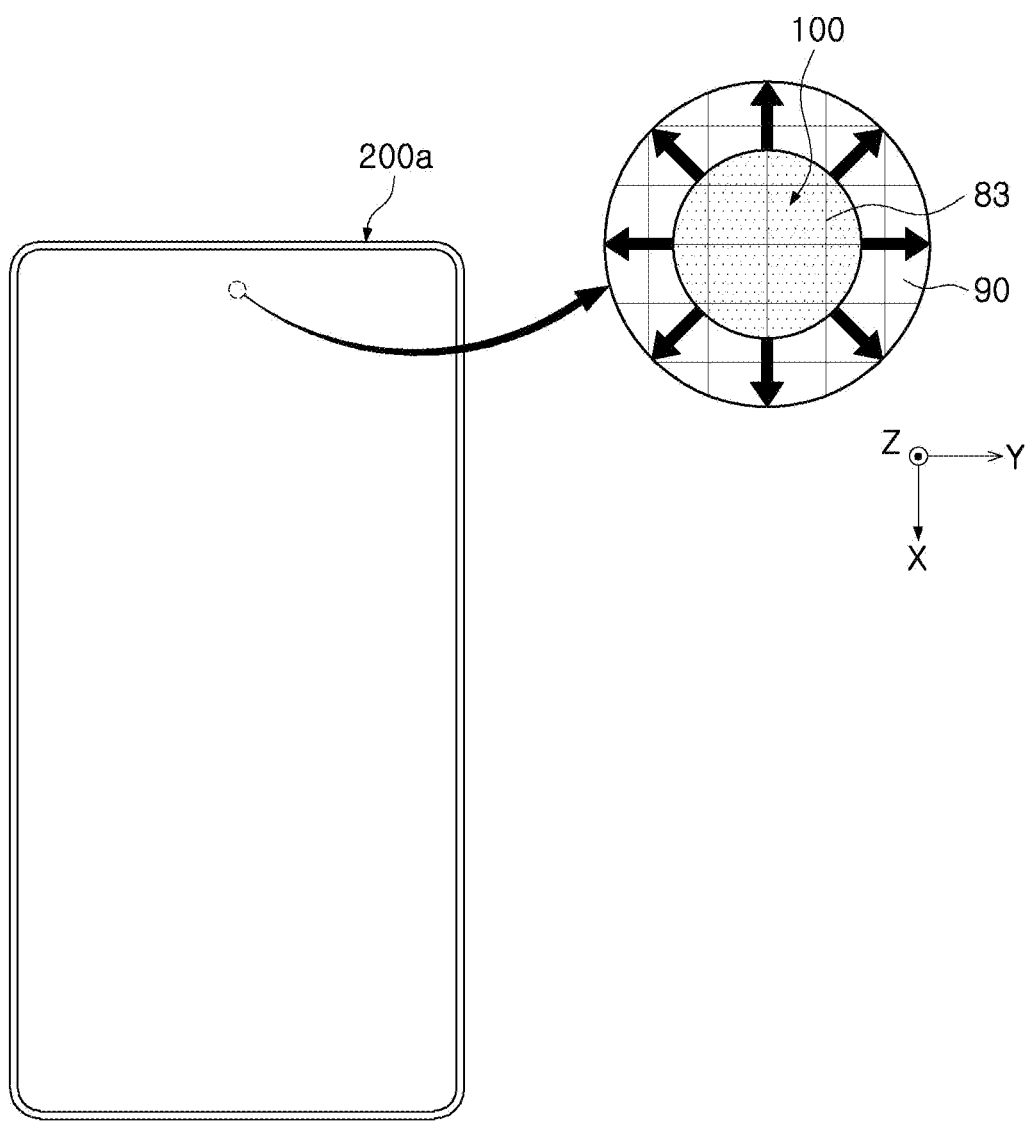
FIG. 1A illustrates a plan view of an example electronic device including a camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1A illustrates a plan view of an example electronic device including a camera module, in accordance with one or more embodiments, and FIGS. 1B to 1F are side views of an example image capturing apparatus and an example electronic device, in accordance with one or more embodiments.

Figure 1B:
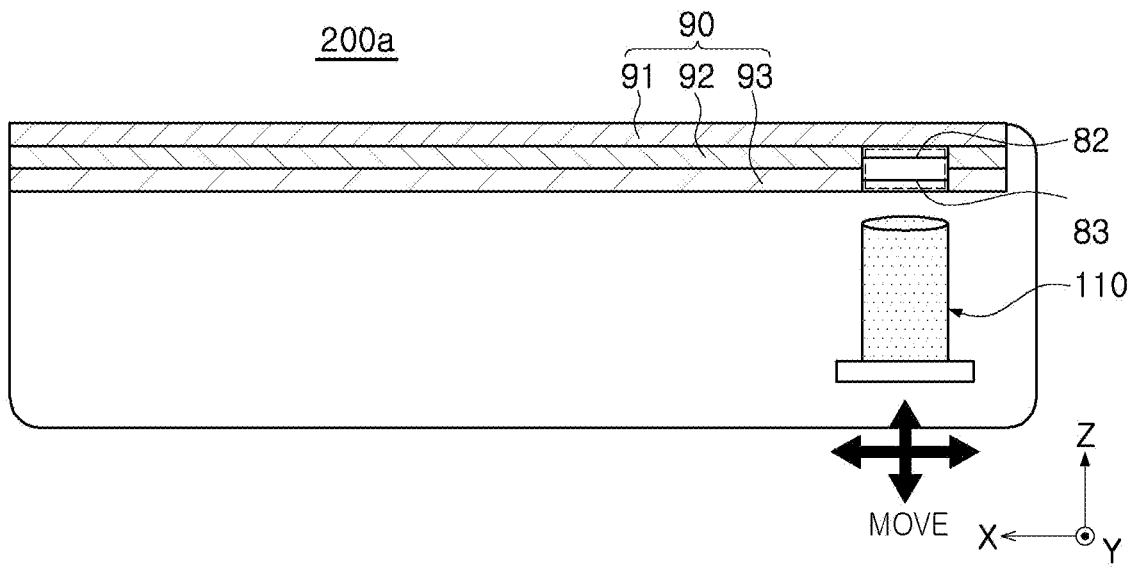
FIGS. 1B to 1F illustrate side views of an example image capturing apparatus, and an example electronic device, in accordance with one or more embodiments.

Referring to FIGS. 1A and 1B, an example electronic device 200a may include a display package 90 and a camera module 110. An image capturing apparatus 100, in accordance with one or more embodiments may include a camera module 110.

The display package 90 may include a display member 93, and may further include a display cover member 91 and/or a touch sensor member 92.

The display cover member 91 may be formed of a transparent material such as glass, and may be configured to protect the display package 90 from external impact.

The touch sensor member 92 may detect a touch of an electronic device user, or the like, in a front direction (for example, a +Z direction), and may include an electric wire 82.

In an example, the touch sensor member 92 may have a structure in which a plurality of sensor pixels, configured to have different impedances, based on whether each of the sensor pixels is touched, and/or depth, are arranged, and the electric wires 82 may be used as a path through which a sensing signal, having a value based on a change in impedance, is transmitted.

The display member 93 may display an image to the front (for example, the +Z direction), and may include an electric wire 83.

In an example, the display member 93 may have a structure in which a plurality of display pixels, each configured such that a display and/or a color varies depending on an input signal, are arranged. The input signal may be transmitted through the electric wire 83.

The input signal and the sensing signal may be generated by an application member of the electronic device 200a, and may be then transmitted to the display member 93.

In a non-limiting example, similarly to an organic light-emitting diode (OLED), the display member 93 may be formed of a flexible material that may be bent depending on an example. However, the examples are not limited thereto.

The camera module 110 may be disposed in the rear of the display package 90 (for example, a −Z direction), and may be disposed such that an image capturing path is directed to the front (for example, the +Z direction).

At least a portion of the display package 90 may be transparent, and the camera module 110 may be disposed to overlap the transparent portion of the display package 90 in a rear direction.

At least a portion of the electric wires 82 and 83 of the display package 90 may be disposed in the image capturing path of the camera module 110.

Therefore, the first image that is captured by the camera module 110 may include electric wires 82 and 83. Additionally, in a target image in front of the display package 90, a region overlapping the electric wires 82 and 83 may not be captured by the camera module 110.

The image capturing apparatus 100 and the electronic device 200a, in accordance with one or more embodiments, may capture a second image in front of the display package 90 in a position different from the position in which the first image is captured.

In an example, an image capturing position of the camera module 110 may be moved such that at least a portion of a non-captured region, covered with the display package 90 in one of the first and second images, is not covered in the other of the first and second images.

Accordingly, the image capturing apparatus 100 and the electronic device 200a, in accordance with one or more embodiments, may more smoothly capture the target image in front of the display package using the first and second images without decreasing a size of the display package 90.

Additionally, the display package 90 may shield the camera module 110 to prevent the camera module 110 from being exposed to external elements. In an example, the display package 90 may have a structure in which a hole, disposed in a portion overlapping the camera module 110 rearwardly, is not formed. Thus, an effective display area of the display package 90 may be further increased when compared with a size of the electronic device 200a.

The number of times the image is captured after the image is focused in the capturing position of the camera module 110, may be three or more, and a third image and/or a fourth image may be further captured. The number of times the image is captured may be determined depending on the complexity of the electric wires 82 and 83 of the display package 90.

Figure 1C:
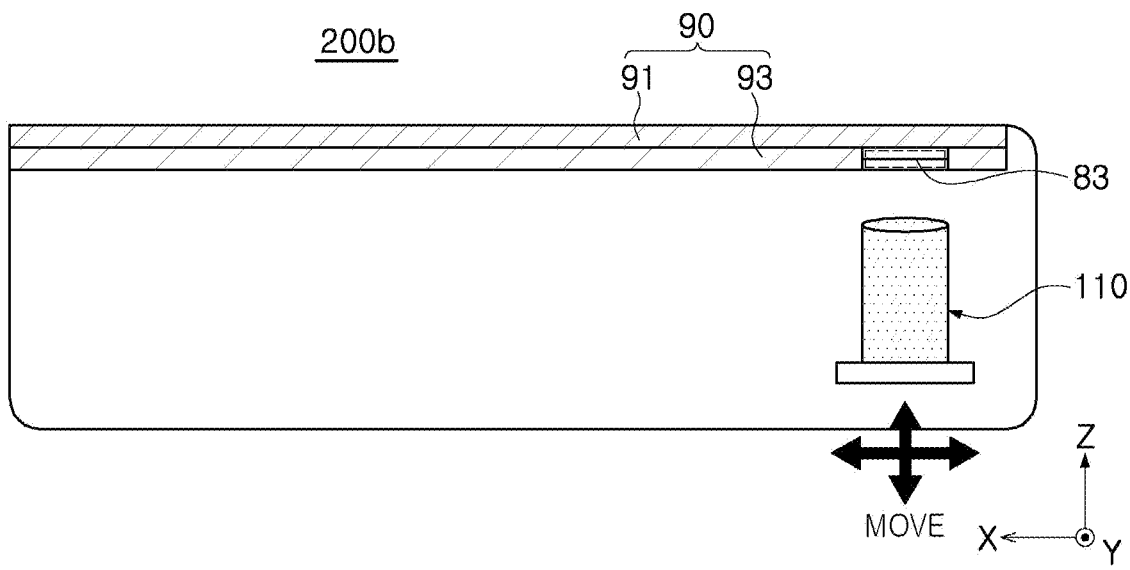

Referring to FIG. 1C, an electronic device 200b, in accordance with one or more embodiments, may include a display package 90 in which a touch sensor member is omitted.

Figure 1D:
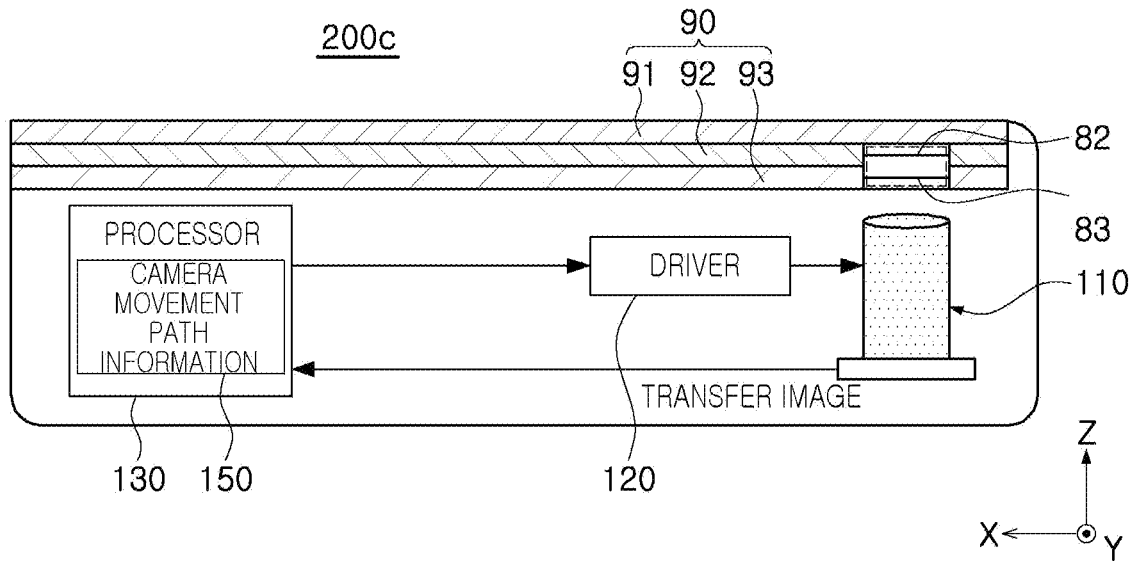

Referring to FIG. 1D, the image capturing apparatus and the electronic device 200c, in accordance with one or more embodiments, may further include a driver 120 and/or a processor 130.

In a non-limiting example, each of the driver 120 and the processor 130 may include an integrated circuit (IC), and may be mounted on a substrate. The driver 120 and the processor 130 may be electrically connected through wiring of the substrate.

The driver 120 may control an image capturing position of the camera module 110.

In an example, the driver 120 may move a lens, provided in the camera module 110, and/or may move the camera module 110 in a horizontal direction (for example, an X direction and/or a Y direction) to control the image capturing position of the camera module 110.

In an example, the camera module 110 may be configured such that a lens of the camera module 110 is moved in the horizontal direction (or in an optical axis direction), according to a surrounding magnetic field (for example, including a magnet or an electromagnet), and the driver 120 may control a current, output to the periphery of the camera module 110, to control the surrounding magnetic field.

In an example, the camera module 110 may include a sensor (for example, a Hall sensor or a gyro sensor, as non-limiting examples) configured to detect a position of the lens and/or a position of the camera module 110, and the driver 120 may control the camera module 110 according to a control structure to which position information is fed-back from the sensor, and may use at least a portion of an optical image stabilizer (OIS) control structure.

The processor 130 may receive the first and second images from the camera module 110, and may compose the first and second images to generate a composite image. When the camera module 110 further captures the third image and/or the fourth image, the processor 130 may compose the first, second, third, and fourth images to generate a composite image. The composite image may be transferred to an application member of the electronic device, and may be output through the display member 93.

In an example, the processor 130 may generate a composite image by composing the other region of the first images, other than a non-captured region covered with the electric wires 82 and 83, and a composite region of the second image overlapping the non-captured region.

When the camera module 110 further captures the third image and/or the fourth image, the processor 130 may generate a composite image by composing the other region of the first image, other than first, second, and/or third non-captured regions covered with the electric wires 82 and 83, and first, second, and/or third composite regions of the second, third, and/or fourth images, respectively overlapping the first, second, and/or third composite regions.

In an example, the processor 130 may store the camera movement path information 150, and may generate a first camera control signal based on a determination that the camera module 110 has captured the first image, and based on the camera movement path information 150, and the driver 120 may control an image capturing position of the camera module 110 based on the first camera control signal.

When the camera module 110 further captures the third image and/or the fourth image, the processor 130 may generate second and/or third camera control signals based on whether the camera module captures second and/or third images, and based on the camera movement path information 150, and the driver 120 may control an image capturing position of the camera module 110 based on the second and/or third camera control signals.

The camera movement path information 150 may be determined by at least a portion of the complexity of the electric wires 82 and 83 of the display package 90, a distance between the display package 90 and the camera module 110 spaced apart from each other, characteristics of the lens provided in the camera module 110, a driving method of the camera module 110 of the driver 120 (for example, a magnetic field method), and composite image capturing time necessary for the electronic device 200c (for example, ⅟30 second).

In an example, the processor 130 may generate camera movement path information 150 based on a pre-image captured by the camera module 110 before capturing the first image.

In an example, the processor 130 may extract thickness information of electric wires 82 and 83, included in the pre-image, from the pre-image and may generate image capturing position movement distance information of the camera module 110 based on the thickness information.

Since the camera movement path information 150 may include the image capturing position movement distance information, the driver 120 may more precisely control the image capturing position of the camera module 110 based on the image capturing position movement distance information.

Accordingly, the image capturing position of the camera module 110 may be moved based on an image capturing position movement distance determined based on a thickness of a region corresponding to the electric wires 82 and 83 in the pre-image.

In an example, the processor 130 may extract information of the number of a plurality of regions divided by the electric wires 82 and 83, included in the pre-image, from the pre-image, and may determine the number of times the image is captured after the imaging capturing position of the camera module 110 is moved, based on the information of the number of plural regions.

In an example, the regions of the display package 90 that are covered by the electric wires 82 and 83, may be obscured in the first image when the first image is captured.

In an example, the number of the plurality of divided regions when the electric wires 82 and 83 have a lattice structure, may be twice the number of the plurality of divided regions when the electric wires 82 and 83 have a one-dimensional structure. Additionally, the processor 130 may set relatively more image capturing times when the electric wires 82 and 83 have a lattice structure.

Accordingly, the image capturing position of the camera module 110 may be sequentially moved by the number of times the image is captured that is determined based on the number of the plurality of divided regions divided by the regions corresponding to the electric wires 82 and 83 in the pre-image, and a plurality of images may be sequentially captured.

Figure 1E:
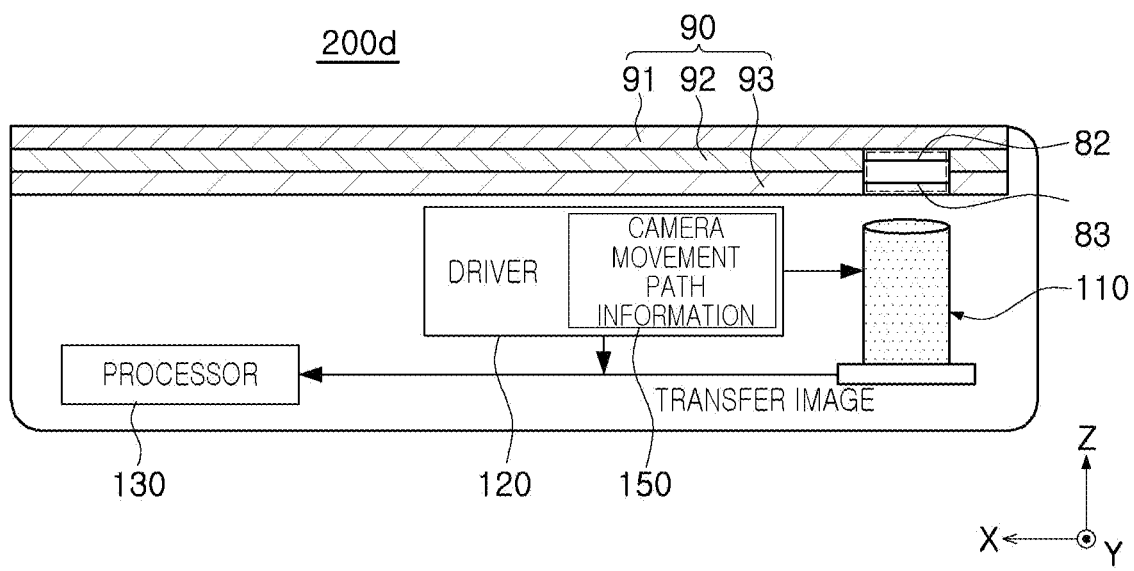

Referring to FIG. 1E, the driver 120 may include camera movement path information 150, and may control an image capturing position of the camera module 110 based on the camera movement path information 150.

Figure 1F:
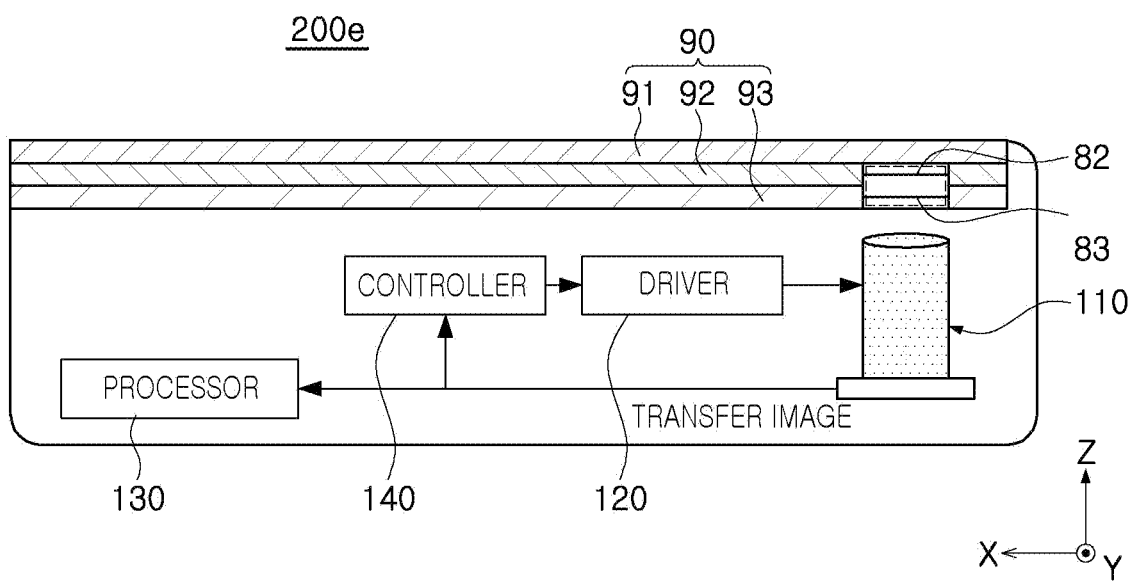

Referring to FIG. 1F, the electronic device 200b, in accordance with one or more embodiments, may further include a controller 140, that includes the camera movement path information.

In an example, the controller 140 may include an additional integrated circuit (IC) separated from the driver 120 and the processor 130, may be mounted on a substrate, and may be electrically connected to the driver 120 and/or the processor 130 through a wiring of the substrate.

Figure 2A:
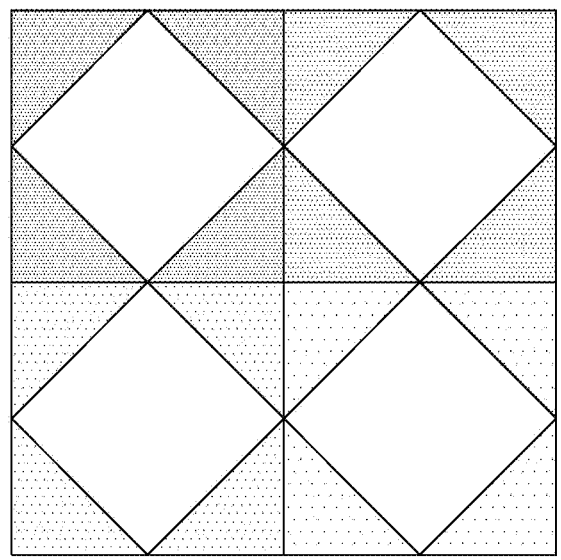
FIG. 2A illustrates a target image of an example image capturing apparatus, an example electronic device, and a camera module control method in an example electronic device, in accordance with one or more embodiments.
Figure 2B:
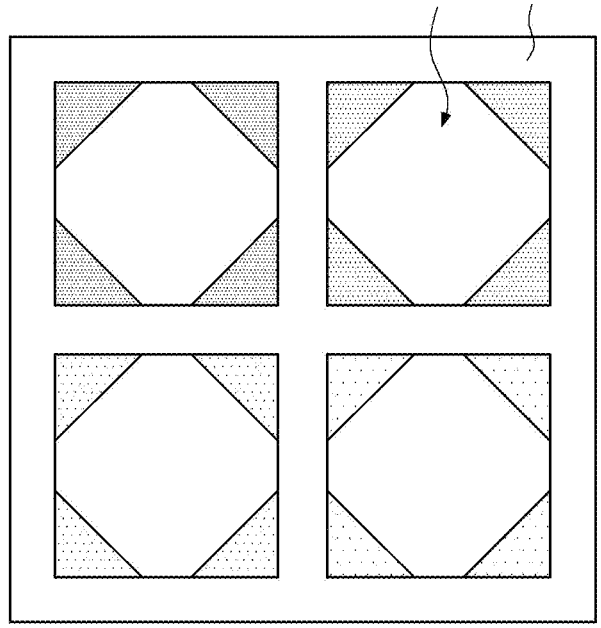
FIG. 2B illustrates an example first image captured by an example image capturing apparatus, an example electronic device, and a camera module control method in the example electronic device, in accordance with one or more embodiments.
Figure 2C:
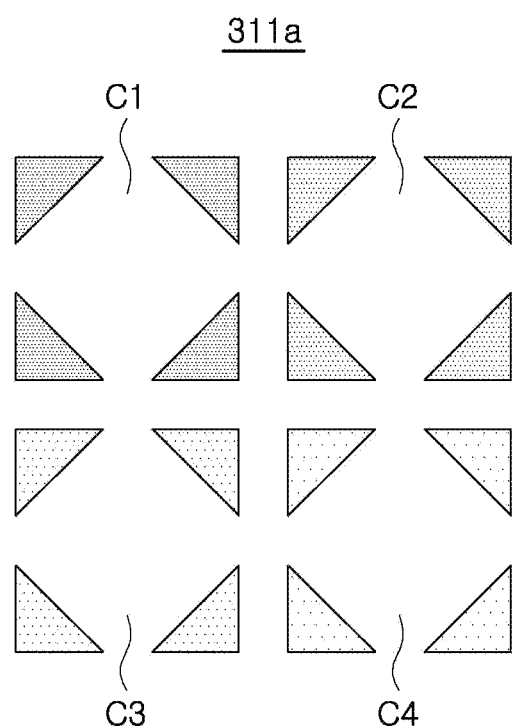
FIG. 2C illustrates a plurality of regions divided by a non-captured region in the first image of FIG. 2B.

FIG. 2A illustrates a target image of an example image capturing apparatus, an example electronic device, and a camera module control method in an example electronic device, in accordance with one or more embodiments, FIG. 2B illustrates a first image captured by an example image capturing apparatus in an example electronic device, and a camera module control method in the example electronic device, in accordance with one or more embodiments, and FIG. 2C illustrates a plurality of regions divided by a non-captured region in the first image of FIG. 2B.

Referring to FIGS. 2A and 2B, a first image 310a may include a captured region 311a, and a target image 300a may further include a non-captured region 312a of the first image 310a.

Referring to FIG. 2C, the captured region 311a may include a plurality of regions C1, C2, C3, and C4 divided into n regions (where n is a positive integer) in the non-captured region.

Figure 3A:
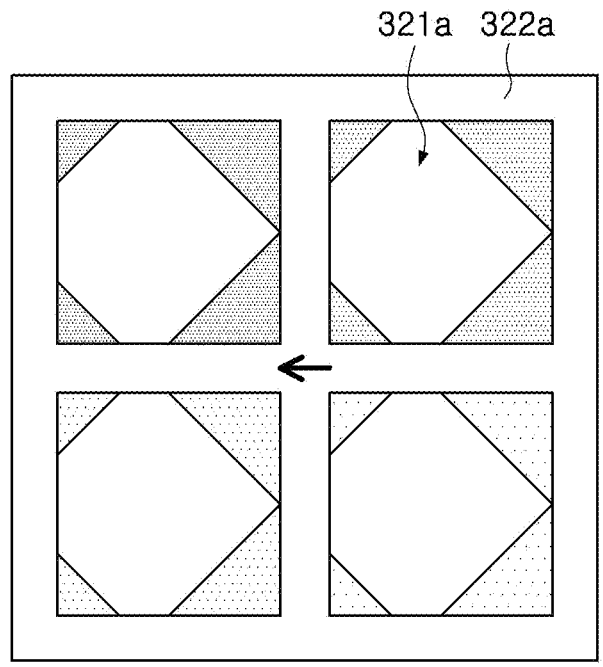
FIGS. 3A to 3F illustrate a plurality of images captured by an example image capturing apparatus, an example electronic device, and a camera module control method in the example electronic device, in accordance with one or more embodiments.
Figure 3A:
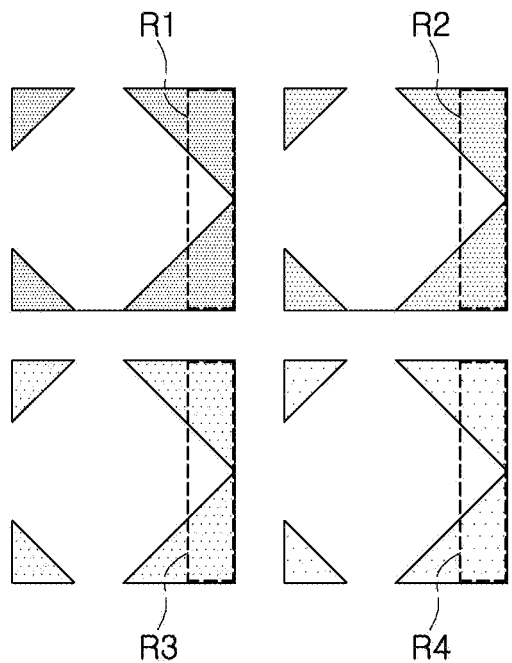
Figure 3B:
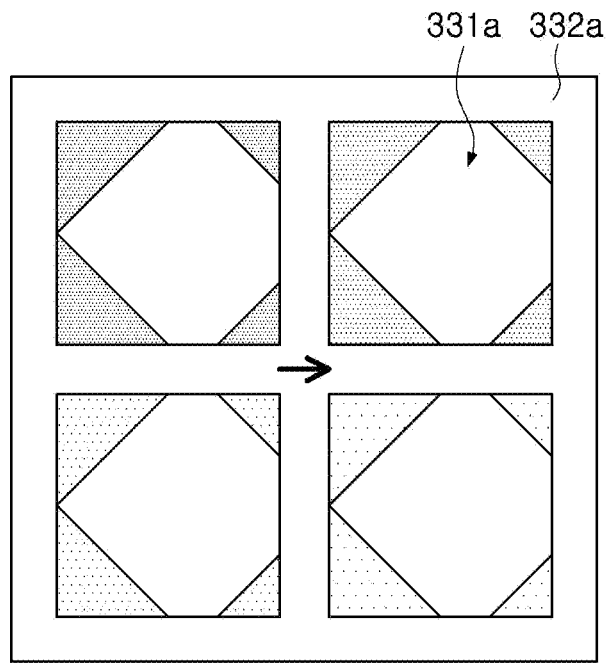
Figure 3B:
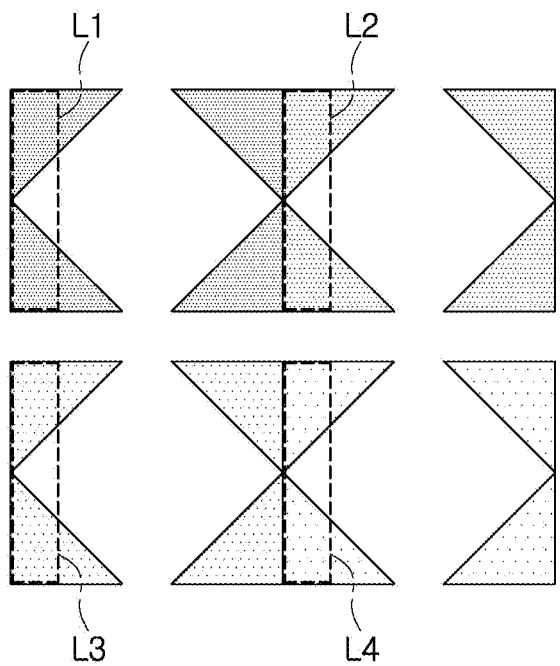
Figure 3C:
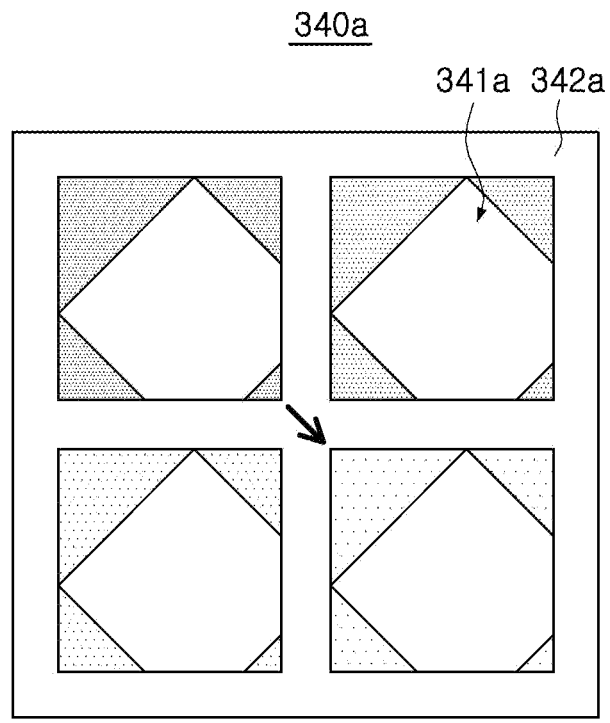
Figure 3C:
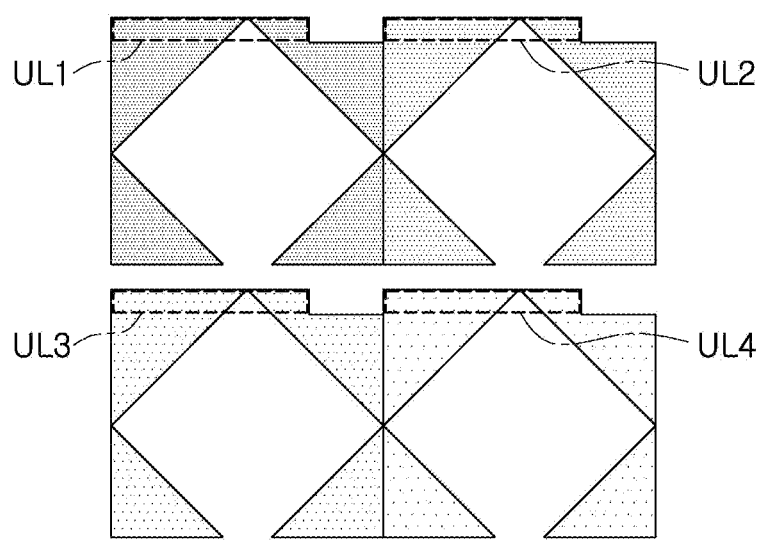
Figure 3D:
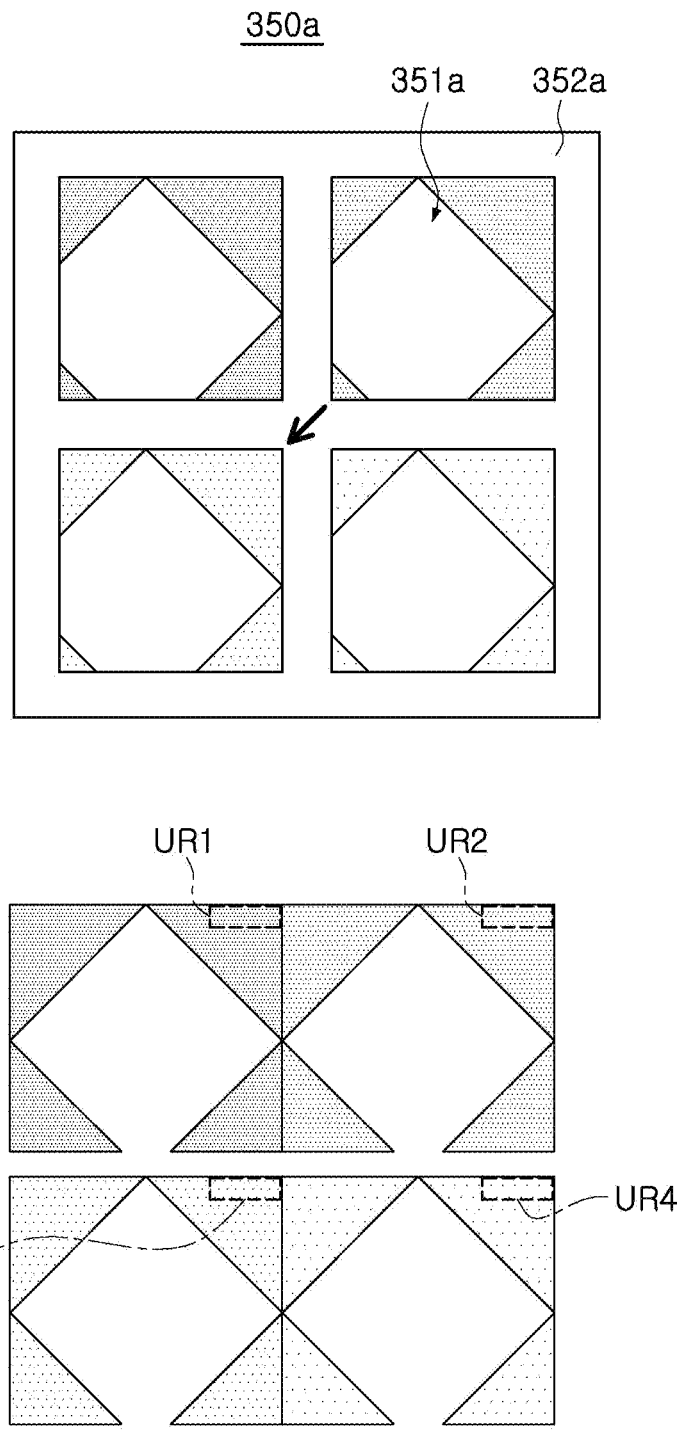
Figure 3E:
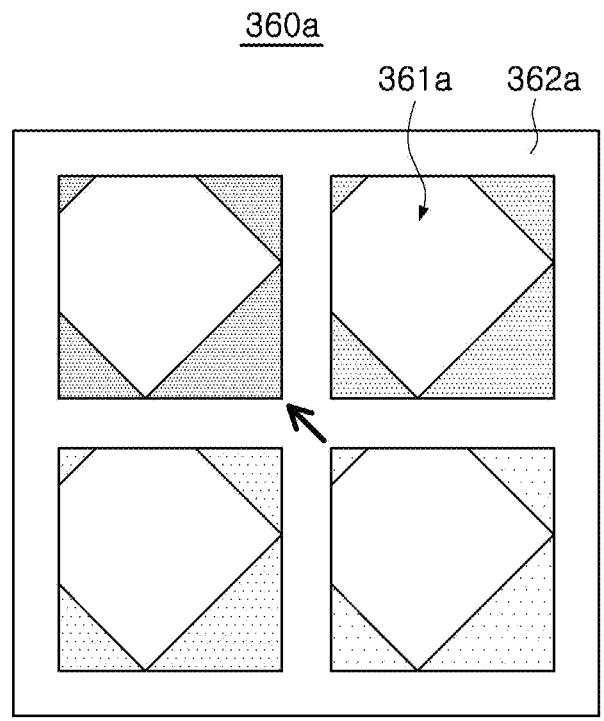
Figure 3E:
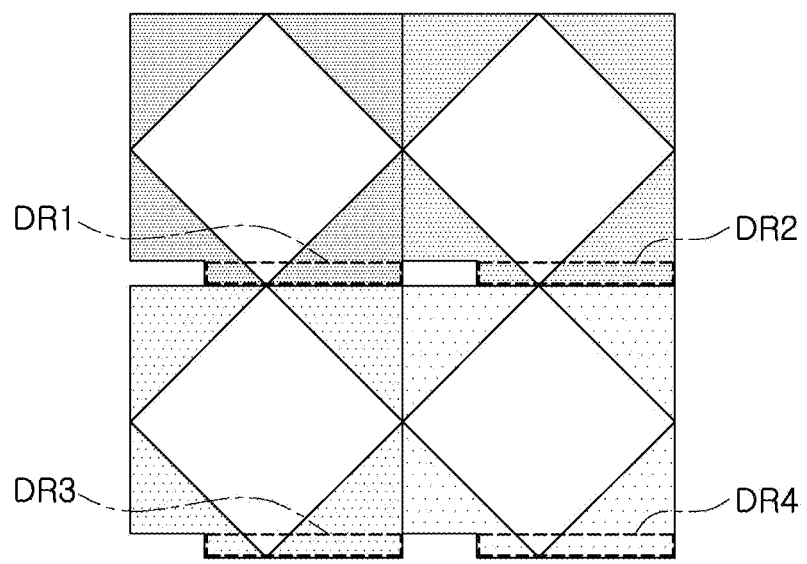
Figure 3F:
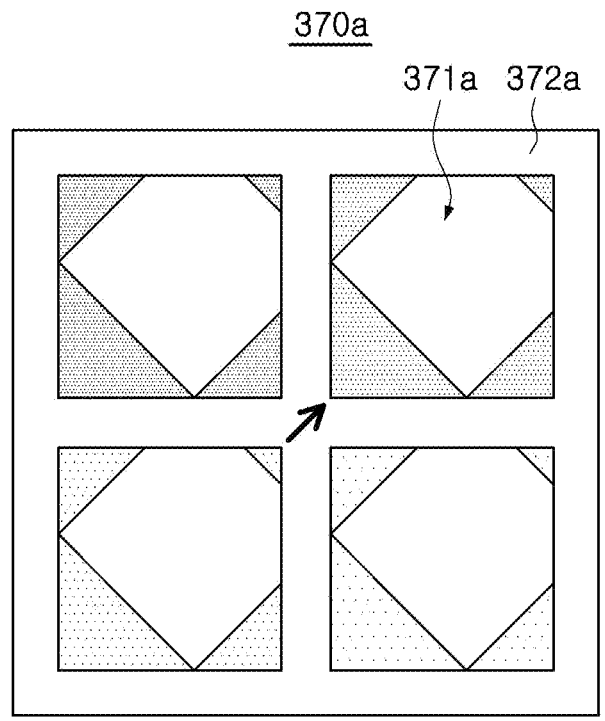
Figure 3F:
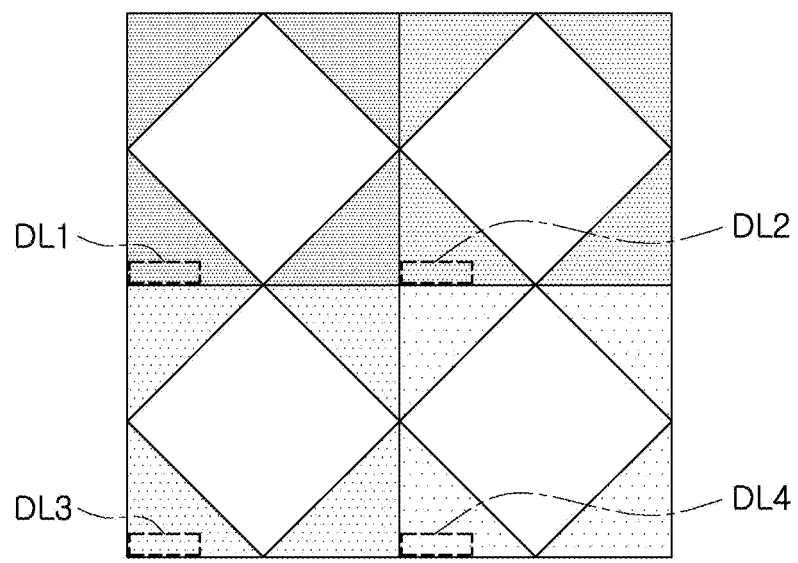
Figure 3G:
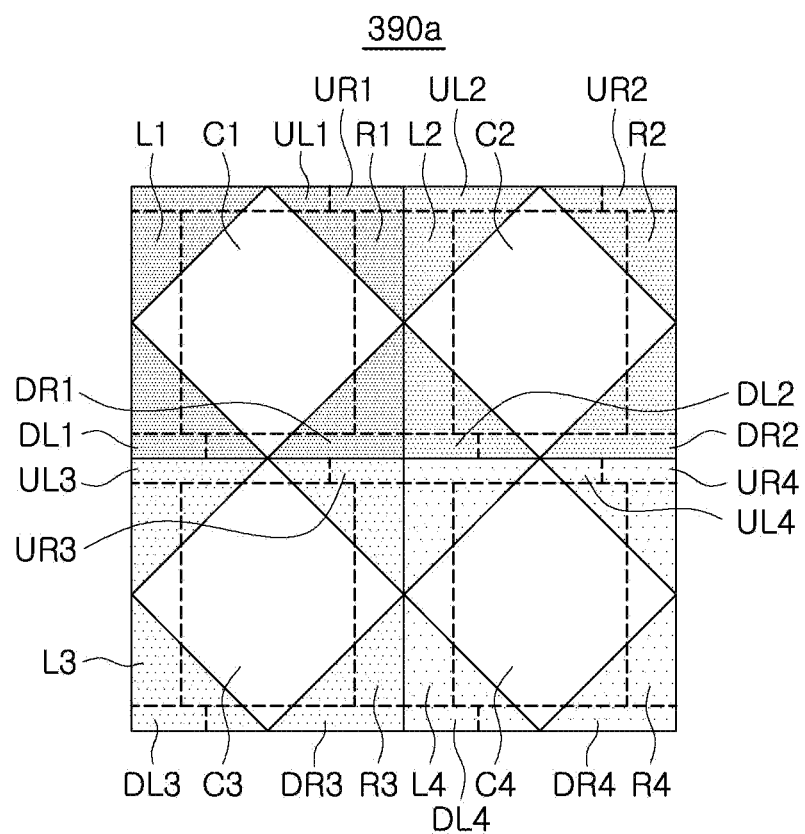
FIG. 3G illustrates a composite image in which a plurality of composite regions, corresponding to a plurality of a non-captured regions of FIGS. 3A to 3F, are composed with the plurality of divided regions of FIG. 2C.

FIGS. 3A to 3F illustrate a plurality of images captured by an example image capturing apparatus, an example electronic device, and a camera module control method in the example electronic device, in accordance with one or more embodiments, and FIG. 3G illustrates a composite image in which a plurality of composite regions, corresponding to a plurality of a non-captured regions of FIGS. 3A to 3F, are composed with the plurality of divided regions of FIG. 2C.

Referring to FIG. 3A, a 2-1-th image 320a may include a captured region 321a and a non-captured area 322a.

As indicated by the arrow in FIG. 3A, an image capturing position of a camera module may move to a left side, and a region corresponding to an electric wire of a display package may move to a right side.

Accordingly, a portion of an image capturing region 321a of the 2-1-th image 320a may overlap a first non-captured region of a first image, and composite regions R1, R2, R3, and R4 corresponding to the first non-captured region may be composed with right sides of a plurality of divided regions.

Referring to FIG. 3B, a 2-2-th image 330a may include a captured region 331a and a non-captured region 332a.

As indicated by the arrow in FIG. 3B, the image capturing position of the camera module may move to a right side, and the region corresponding to the electric wire of the display package may move to a left side.

Accordingly, a portion of a captured region 331a of the 2-2-th image 330a may overlap the first non-captured region of the first image, and composite regions L1, L2, L3, and L4 corresponding to the first non-captured region may be composed with left sides of a plurality of divided regions.

Referring to FIG. 3C, a 3-1-th image 340a may include a captured region 341a and a non-captured region 342a.

As indicated by the arrow in FIG. 3C, an image capturing position of the camera module may move to a lower right side, a region corresponding to the electric wire of the display package may move to an upper left side.

Accordingly, a portion of the captured region 341a of the 3-1-th image 340a may overlap with a second non-captured region of the first image, and composite regions UL1, UL2, UL3, and UL4 corresponding to the second non-captured region may be composed with upper left sides of a plurality of divided regions.

Referring to FIG. 3D, a 3-2-th image 350a may include a captured region 351a and a non-captured region 352a.

As indicated by the arrow in FIG. 3D, an image capturing position of the camera module may be moved to a lower left side, and a region corresponding to the electric wire of the display package may move to an upper right side.

Accordingly, a portion of the captured region 351a of the 3-2-th image 350a may overlap a second non-captured region of the first image, and composite regions UR1, UR2, UR3, and UR4 corresponding to the second non-captured region may be composed with upper right sides of a plurality of divided regions.

Referring to FIG. 3E, a 4-1-th image 360a may include a captured region 361a, and a non-captured region 362a.

As indicated by the arrow in FIG. 3E, an image capturing position of the camera module may move to an upper left side, and a region corresponding to the electric wire of the display package may move to a lower right side.

Accordingly, a portion of the captured region 361a of the 4-1-th image 360a may overlap a third non-captured region of the first image, and composite regions DR1, DR2, DR3, and DR4 corresponding to the third non-captured region may be composed with lower right sides of a plurality of divided regions.

Referring to FIG. 3F, a 4-2-th image 370a may include a captured region 371a and a non-captured region 372a.

As indicated in the arrow in FIG. 3F, an image capturing position of the camera module may move to an upper right side, and a region corresponding to the electric wire of the display package may move to a lower left side.

Accordingly, a portion of the captured region 371a of the 4-2 image 370a may overlap the third non-captured region of the first image, and composite regions DL1, DL2, DL3, and DL4 corresponding to the third non-captured region may be composed with lower left sides of a plurality of divided regions.

Referring to FIG. 3G, a composite image 390a may have a structure in which a plurality of divided regions C1, C2, C3, and C4, composite regions R1, R2, R3, R4, L1, L2, L3, and L4 corresponding to a first non-captured region, composite regions UL1, UL2, UL3, UL4, UR1, UR2, UR3, and UR4 corresponding to a second non-captured region, and composite regions DL1, DL2, DL3, DL4, DR1, DR2, DR3, and DR4 corresponding to a third non-captured region are composed.

Figure 4A:
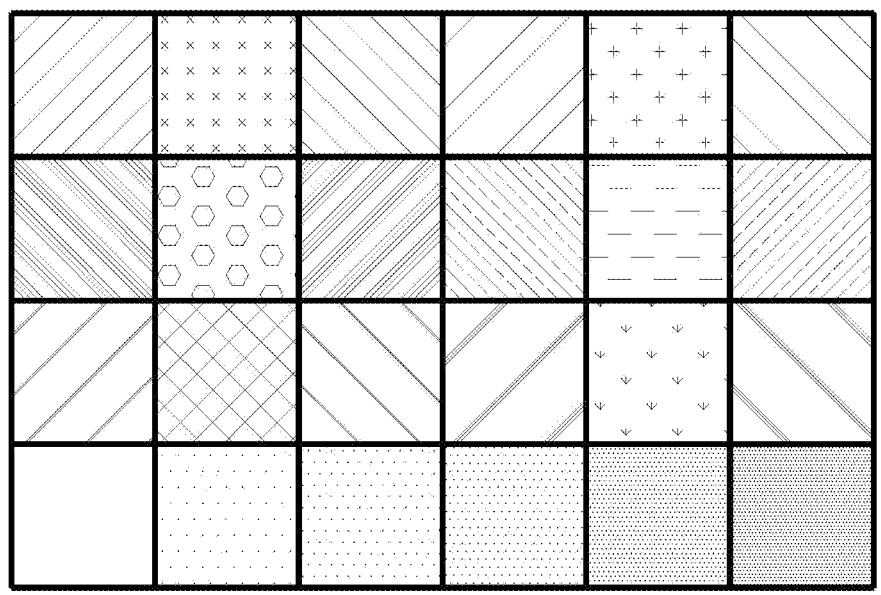
FIGS. 4A to 4C illustrate an example target image, an example first image, and an example second image captured by an example image capturing apparatus, an example electronic device, and a camera module control method in the example electronic device, in accordance with one or more embodiments.
Figure 4B:
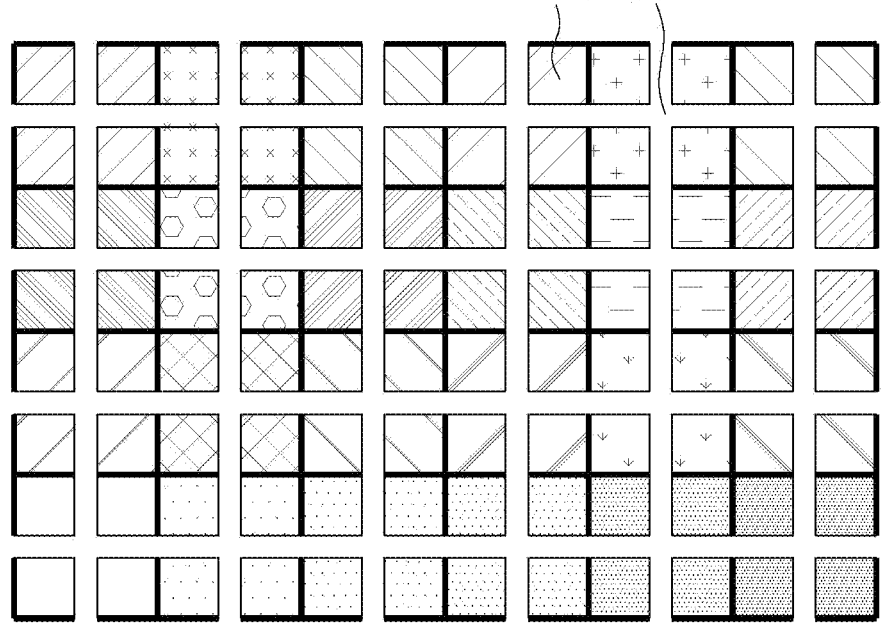
Figure 4C:
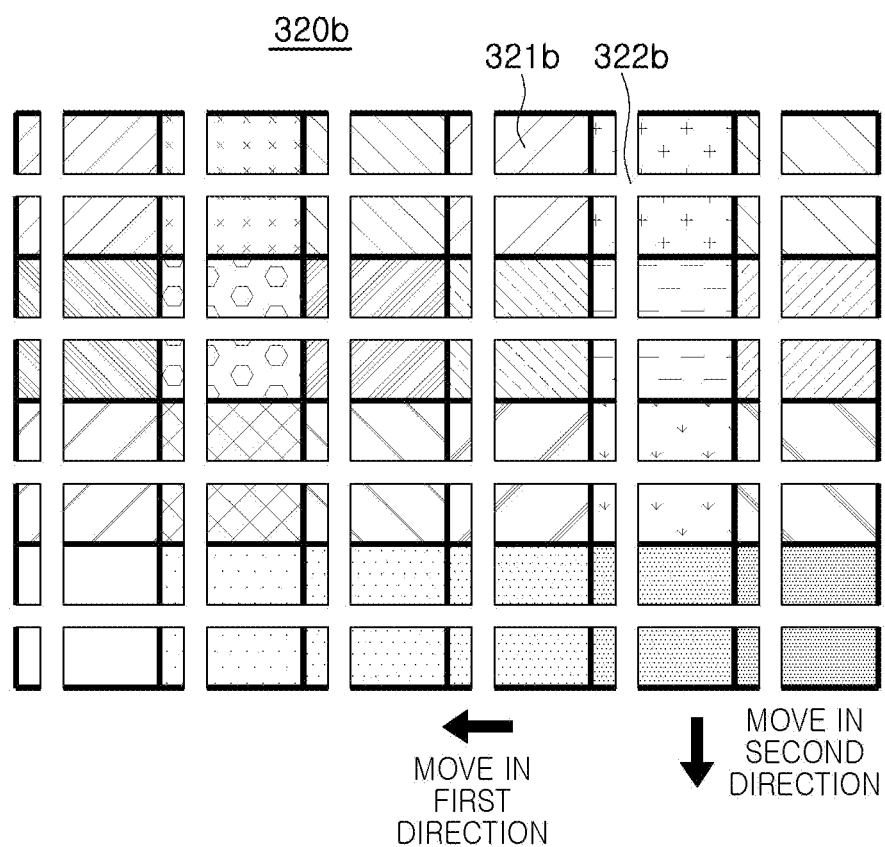

FIGS. 4A to 4C illustrate a target image 300b, a first image 310b, and a second image 320b captured by an image capturing apparatus in an electronic device, and a method to control a camera module in the electronic device, in accordance with one or more embodiments.

Referring to FIGS. 4A and 4B, a first image 310b may include a captured region 311b, and a target image 300b may further include a non-captured region 312b of the first image 310b.

Referring to FIG. 4C, a second image 320b may include a captured region 321b, and a non-captured region 322b, and an image capturing position of a camera module may move in a first direction and a second direction.

Since at least a portion of the captured region 321b of the second image 320b may overlap the non-captured region 312b of the first image 310b, the composition of the first image 310b and the second image 320b may allow a composite image to be more similar to the target image 300b.

Figure 5A:
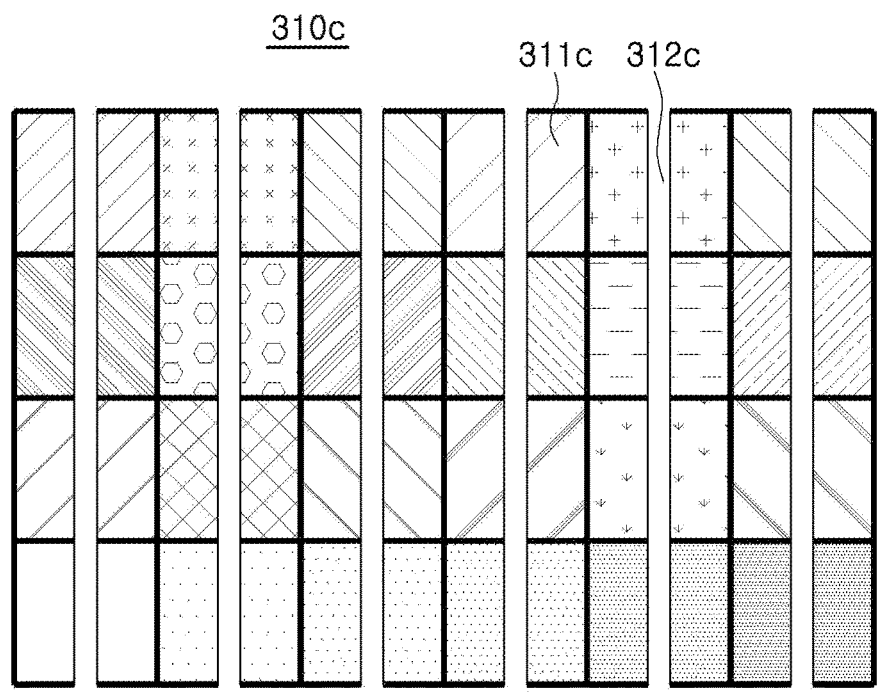
FIGS. 5A and 5B illustrate an example first image and an example second image captured by an example image capturing apparatus, an example electronic device, and a camera module control method in the example electronic device, in accordance with one or more embodiments.
Figure 5B:
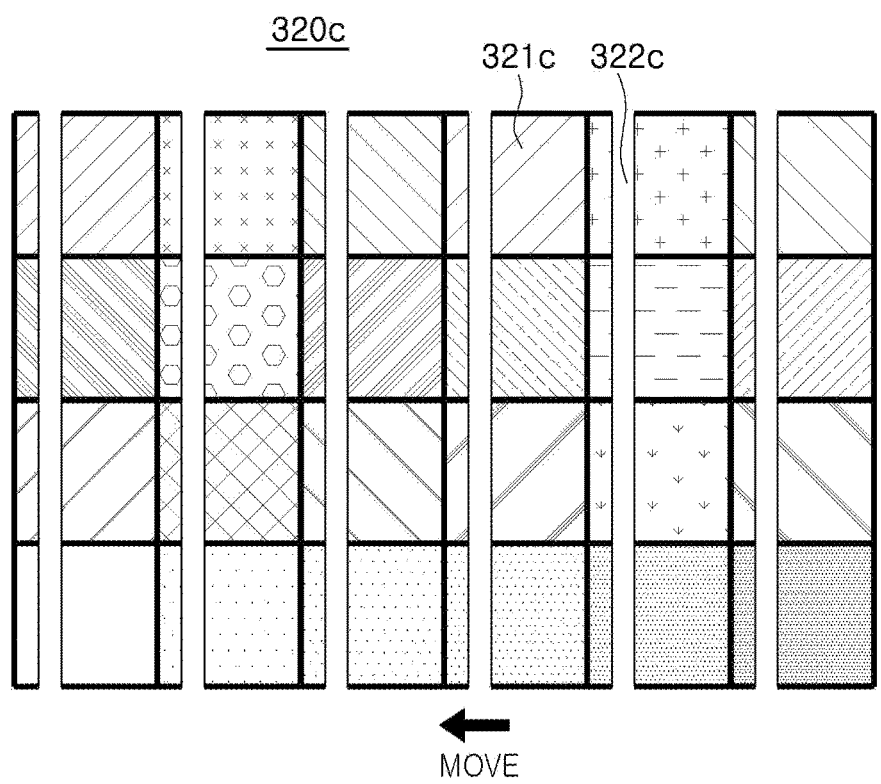

FIGS. 5A and 5B illustrate a first image 310c and a second image 320c captured by an image capturing apparatus in an electronic device, and a method to control a camera module in the electronic device, in accordance with one or more embodiments.

Referring to FIG. 5A, a first image 310c may include a captured region 311c and a non-captured region 312c, and the non-captured region 312c may have a one-dimensional structure.

Referring to FIG. 5B, a second image 320c may include a captured region 321c and a non-captured region 322c, and an image capturing position of a camera module may be one-dimensionally moved.

In an example, the number of times an image is captured by the image capturing apparatus in the electronic device, and a method to control a camera module in the electronic device is not limited to being plural.

Figure 6:
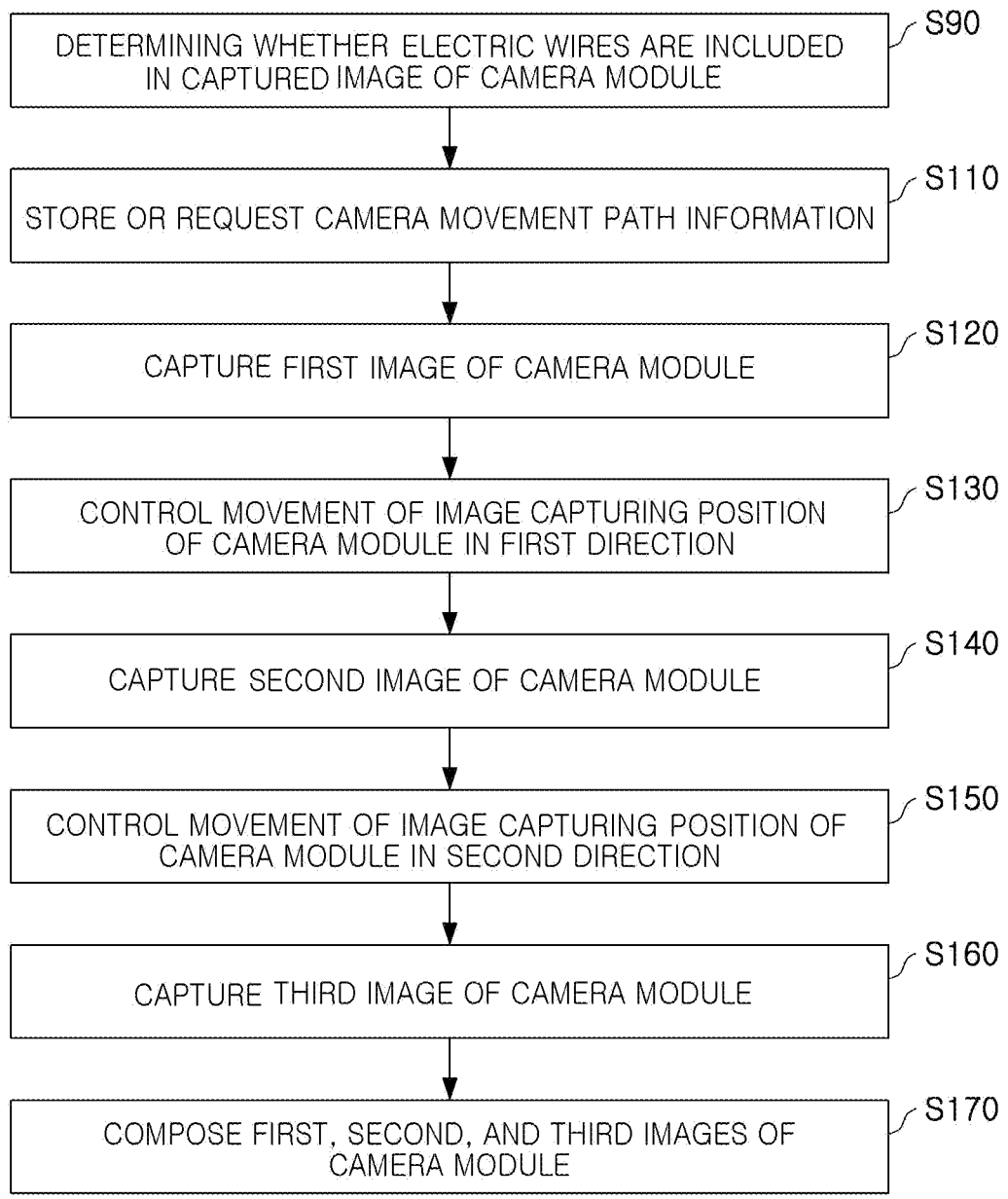
FIG. 6 is a flowchart illustrating a camera module control method in an example electronic device, in accordance with one or more embodiments.

FIG. 6 is a flowchart illustrating a camera module control method in an electronic device, in accordance with one or more embodiments.

Referring to FIG. 6, an electric wire may be included in an image captured by a camera module in an electronic device (operation S90), and an electronic device, based on a control method, may store or request camera movement path information (operation S110).

The camera movement path information may include a path through which an image capturing position of the camera module is moved such that at least a portion of first and second non-captured regions, covered with an electric wire of a display member, or an electric wire of a touch sensor member in one of first, second, and third images, is not covered in a remainder of the first, second, and third images.

The electronic device may capture the first image of the camera module (operation S120), and may then control movement of the image capturing position of the camera module in a first direction based on the camera movement path information (operation S130).

The electronic device may capture the second image of the camera module (operation S140), and may then control movement of the image capturing position of the camera module in a second direction based on the camera movement path information (operation S150).

The electronic device may capture the third image of the camera module (operation S160), and may generate a composite image by composing the other regions of the first, second, and third images, other than the first and second non-captured regions, and a region, corresponding to the first and second non-captured regions, among the other regions of the first, second, and third images (operation S170).

In an example, a method to control a camera module in an electronic device according to an example may be performed by a processor in an electronic device (for example, a central processing unit (CPU), a graphics processing unit (GPU), a microprocessor, an application specific integrated circuit ASIC), a field programmable gate arrays (FPGA), or the like), may be stored by a memory (for example, a volatile memory (for example, a RAM, or the like), a nonvolatile memory (for example, a ROM, a flash memory, or the like), a magnetic storage, an optical storage, or the like), and may be performed through the above-mentioned application member.

As described above, an image capturing apparatus, an electronic device, and a method to control a camera module in the electronic device according to an example may smoothly capture an image even when a display area and/or a touch detection area of the electronic device is increased to overlap an image capturing path of a camera module.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image capturing apparatus comprising:
    a display member, configured to display a display image;
    a camera module, disposed behind the display member; and
    a touch sensor member, configured to detect a touch input;
    wherein the camera module is configured to:
        capture a first image in a first position in front of the display member or in front of the touch sensor member; and
        capture a second image in a second position in front of the display member or in front of the touch sensor member, the second position being different from the first position,
    wherein an image capturing position of the camera module is moved such that at least a portion of a non-captured region, covered by the display member or the touch sensor member in one of the first image and the second image, is not covered in the other of the first image and the second image, and
    wherein the camera module is configured to capture an image based on the image capturing position having moved in a corresponding direction, and is configured to capture another image based on the image capturing position having moved in an obtuse or acute angled direction with respect to the corresponding direction.

2. The apparatus of claim 1, wherein the camera module is configured to capture the second image after the image capturing position is moved in a first direction, and is configured to capture a third image after the image capturing position is moved in a second direction, and
    the image capturing position of the camera module is moved such that at least a portion of a first non-captured region and a second non-captured region, that is covered with the display member or the touch sensor member in one of the first image, the second image, and the third image, is not covered in a remainder of the first image, the second image, and the third image.

3. The apparatus of claim 2, further comprising:
    a processor, configured to generate a composite image by composing regions other than the first non-captured region and the second non-captured region, in one of the first image, the second image, and the third image, and first and second composite regions corresponding to the first non-captured region and the second non-captured region in a remainder of the first image, the second image, and the third image.

4. The apparatus of claim 3, further comprising:
    a driver, configured to receive first and second camera control signals from the processor, and control the image capturing position of the camera module based on the first and second camera control signals,
    wherein the processor is configured to:
        store camera movement path information;
        generate the first camera control signal based on a determination that the camera module has captured the first image, and based on the camera movement path information; and
        generate the second camera control signal based on a determination that the camera module has captured the second image, and based on the camera movement path information.

5. The apparatus of claim 3, further comprising:
    a controller configured to:
        store camera movement path information;
        generate a first camera control signal based on a determination that the camera module has captured the first image, and based on the camera movement path information; and
        generate a second camera control signal based on a determination that the camera module has captured the second image, and based on the camera movement path information; and
    a driver, configured to control the image capturing position of the camera module based on the first camera control signal and the second camera control signal.

6. The apparatus of claim 2, further comprising:
    a driver, configured to:
        store camera movement path information;
        move the image capturing position of the camera module in a first direction based on a determination that the camera module has captured the first image, and based on the camera movement path information;
        move the image capturing position of the camera module in a second direction based on a determination that the camera module has captured the second image, and based on the camera movement path information.

7. The apparatus of claim 2, wherein the camera module is further configured to capture a fourth image after the image capturing position is moved in a third direction, and one direction of the first direction, the second direction, and the third direction is diagonal to a remaining direction of the first direction, the second direction, and the third direction other than the one direction.

8. The apparatus of claim 1, wherein the display member or the touch sensor member is configured to cover a front surface of the camera module.

9. The apparatus of claim 1, wherein the display member or the touch sensor member comprises an electric wire, and the non-captured region is covered by the electric wire.

10. The apparatus of claim 9, wherein the camera module is configured to capture a pre-image before capturing the first image, and the image capturing position of the camera module is moved by an image capturing movement distance that is determined based on a thickness of a region corresponding to the electric wire in the pre-image.

11. The apparatus of claim 9, wherein the camera module is configured to capture a pre-image before capturing the first image, and is configured to capture a plurality of images including the first image and the second image, the image capturing position of the camera module is sequentially moved by a number of times that is determined based on a number of a plurality of regions divided by a region corresponding to the electric wire, and a number of the plurality of images is determined based on the number of the plurality of divided regions.

12. An electronic device comprising:

a display member configured to display a display image;

a camera module disposed behind the display member and configured to capture a first image in a first position in front of the display member, and to capture a second image in a second position in front of the display member, wherein the first position is different from the second position; and a driver configured to control an image capturing position of the camera module such that at least a portion of a non-captured region, covered by the display member in one of the first image and the second image, is not covered in the other of the first image and the second image, and wherein, dependent on a corresponding control by the driver, the camera module is configured to capture an image based on the image capturing position having moved in a corresponding direction, and is configured to capture another image based on the image capturing position having moved in an obtuse or acute angled direction with respect to the corresponding direction.

13. The device of claim 12, wherein the display member is configured to cover a front surface of the camera module.

14. The device of claim 12, further comprising:

a processor configured to generate a composite image by composing regions other than the non-captured region, in one of the first image and the second image, and a composite region, corresponding to the non-captured regions, in the other of the first image and the second image.

15. The device of claim 14, further comprising:

a controller, configured to store camera movement path information, and to generate a camera control signal based on a determination that the camera module has captured the first image and the camera movement path information, wherein the driver is configured to control the image capturing position of the camera module based on the camera control signal.

16. The device of claim 15, wherein the camera module is configured to capture a pre-image before capturing the first image, and one of the processor, the controller, and the driver is configured to determine an image capturing position movement distance based on a thickness of a region that is covered by the display member in the pre-image, and store the camera movement path information based on the image capturing position movement distance.

17. The device of claim 15, wherein the camera module is configured to capture a pre-image before capturing the first image, and capture a plurality of images including the first image and the second image, and one of the processor, the controller, and the driver is configured to determine a number of camera movement times based on a number of a plurality of regions divided by a region covered by the display member in the pre-images, and store the camera movement path information based on the number of times of camera movement.

18. The device of claim 12, wherein the driver is configured to move the image capturing position of the camera module in a first direction, and move the image capturing position of the camera module in a second direction after the camera module captures the first image, and the camera module is configured to capture a third image after the driver moves the image capturing position in the second direction.

19. The device of claim 18, wherein the driver is configured to move the image capturing position of the camera module in a third direction after the camera module captures the third image, the camera module is configured to capture a fourth image after the driver moves the image capturing position in the third direction, and one direction of the first direction, the second direction, and the third direction is diagonal to a remaining direction of the first direction, the second direction, and the third direction other than the one direction.

20. An electronic device comprising:

a display element;

a camera module including an image capturing device, where the image capturing device is configured to:

capture a first image disposed in a first image capturing position path of the camera module; and capture a second image disposed in a second image-capturing position path of the camera module;

a processor, configured to compare the first image and the second image, and determine whether a portion of the first image and the second image is covered by a portion of the display element; and a controller, configured to capture a third image based on a result of the comparing.

21. The device of claim 20, further comprising a driver configured to move a lens of the camera module to control the movement between the first image-capturing position and the second image-capturing position.

22. The device of claim 20, wherein the processor is configured to generate a composite image from the first image, the second image and the third image, and output the composite image.

23. The device of claim 22, wherein the composite image is generated by composing regions of the first image excluding regions covered by the portion of the display element, with regions of the one or more second images that overlap the excluded regions of the first image.

24. An electronic device comprising:

a processor;

a driver; and a camera module configured to:

capture, in a first image-capturing position, a first image including an obscured region disposed in an image capturing path of the camera module; and capture, in a second camera module position, a second image excluding the obscured region;

wherein the first image-capturing position is different from the second image-capturing position, and wherein the processor is configured to generate a composite image by composing regions of the first image other than the obscured region, with a composite region of the second image overlapping the obscured region, wherein, for the composite image generation, the driver is configured to move a lens of the camera module along a first path in a first direction to the first image-capturing position for the capturing of the first image, and configured to move the lens of the camera module along a second path in a second direction to the second image-capturing position for the capturing of the second image, where the first path and the second path overlap, wherein the processor is configured to determine thickness information of the obscured region, and generate image capturing position movement information of the camera module based on the thickness information.

25. An electronic device comprising:
a processor;
a driver; and
a camera module configured to:
capture, in a first image-capturing position, a first image including an obscured region disposed in an image capturing path of the camera module; and
capture, in a second camera module position, a second image excluding the obscured region;
wherein the first image-capturing position is different from the second image-capturing position, and
wherein the processor is configured to generate a composite image by composing regions of the first image other than the obscured region, with a composite region of the second image overlapping the obscured region,
wherein the processor is configured to determine thickness information of the obscured region, and generate image capturing position movement information of the camera module based on the thickness information.

26. The device of claim 24, wherein the driver is configured to move a lens of the camera module in one of an x-axis direction and a y-axis direction to control the image capturing position of the camera module.

27. An electronic device comprising:
a processor;
a driver; and
a camera module configured to:
capture, in a first image-capturing position, a first image including an obscured region disposed in an image capturing path of the camera module; and
capture, in a second camera module position, a second image excluding the obscured region;
wherein the first image-capturing position is different from the second image-capturing position, and
wherein the processor is configured to generate a composite image by composing regions of the first image other than the obscured region, with a composite region of the second image overlapping the obscured region,
wherein the processor is configured to generate camera movement path information based on a pre-image that is captured by the camera module before the capturing of the first image.

28. The device of claim 24, wherein the processor is configured to generate camera movement path information based on a pre-image that is captured by the camera module before the capturing of the first image.

* * * * *